United States Patent
Fritz

Patent Number: 6,047,580
Date of Patent: Apr. 11, 2000

[54] MAKING HYDROPRESS FORMBLOCKS AND DIES UTILIZING STEREOLITHOGRAPHY AND LIQUID MOLDING COMPOUNDS

[75] Inventor: Boris C. Fritz, Redondo Beach, Calif.

[73] Assignee: Northrop Grumman Corporation, Los Angeles, Calif.

[21] Appl. No.: 09/299,400

[22] Filed: Apr. 26, 1999

Related U.S. Application Data

[62] Division of application No. 09/013,401, Jan. 26, 1998, Pat. No. 5,901,593.

[51] Int. Cl.$^7$ .................................................. B21C 51/00
[52] U.S. Cl. ........................... 72/15.2; 72/14.8; 72/378.2; 72/462; 264/401; 76/107.1
[58] Field of Search ..................................... 72/14.8, 15.2, 72/379.2, 462; 264/401; 76/107.1

[56] References Cited

U.S. PATENT DOCUMENTS

| | | | |
|---|---|---|---|
| 2,958,362 | 11/1960 | Creek | 72/456 |
| 4,198,238 | 4/1980 | Scheve | 430/286 |
| 4,844,144 | 7/1989 | Murphy et al. | 164/35 |
| 4,961,154 | 10/1990 | Pomerantz et al. | 364/522 |
| 5,109,589 | 5/1992 | Cramer et al. | 29/527.3 |
| 5,234,636 | 8/1993 | Hull et al. | 264/22 |
| 5,296,335 | 3/1994 | Thomas et al. | 430/320 |
| 5,358,211 | 10/1994 | Sterett | 249/80 |
| 5,435,959 | 7/1995 | Williamson et al. | 264/221 |
| 5,439,622 | 8/1995 | Pennisi et al. | 264/22 |
| 5,458,825 | 10/1995 | Grolman et al. | 264/401 |
| 5,482,659 | 1/1996 | Sauerhoefer | 264/401 |
| 5,485,737 | 1/1996 | Dickerson | 72/57 |
| 5,490,407 | 2/1996 | Doose | 72/57 |
| 5,501,824 | 3/1996 | Almquist et al. | 264/401 |
| 5,562,846 | 10/1996 | McKeen | 249/79 |
| 5,614,075 | 3/1997 | Andre, Sr. | 205/67 |
| 5,616,293 | 4/1997 | Ashtiani-Zarandi et al. | 264/401 |
| 5,637,175 | 6/1997 | Feygin et al. | 156/264 |
| 5,641,448 | 6/1997 | Yeung et al. | 264/401 |
| 5,658,506 | 8/1997 | White et al. | 264/28 |
| 5,705,117 | 1/1998 | O'Conner et al. | 264/401 |
| 5,707,578 | 1/1998 | Johnson et al. | 264/401 |
| 5,728,345 | 3/1998 | Hlavaty et al. | 264/401 |
| 5,824,260 | 10/1998 | Sauerhoefer | 264/401 |
| 5,855,718 | 1/1999 | Nguyen et al. | 264/401 |
| 5,855,836 | 1/1999 | Leyden et al. | 264/401 |
| 5,874,041 | 2/1999 | Matsumura et al. | 264/401 |
| 5,939,011 | 8/1999 | White et al. | 264/401 |

*Primary Examiner*—Ed Tolan
*Attorney, Agent, or Firm*—Terry J. Anderson; Karl J. Hoch, Jr.

[57] ABSTRACT

In accordance with the present invention, there is provided a method of producing a formblock utilizing stereolithography for producing a sheet metal part. A computer formblock model is first designed. Stereolithographic techniques are utilized to create the formblock using the computer formblock model. A part may be formed from a sheet metal blank using the formblock, whereby force is applied to the sheet metal blank to bend it about the formblock.

23 Claims, 3 Drawing Sheets

MAKING HYDROPRESS FORMBLOCKS AND DIES UTILIZING STEREOLITHOGRAPHY AND LIQUID MOLDING COMPOUNDS

This application is a divisional of application Ser. No. 09/013,401, filed Jan. 26, 1998, now U.S. Pat. No. 5,901,593.

FIELD OF THE INVENTION

The present invention relates generally to methods or making formblocks and dies used to form sheet metal parts and more particularly to formblocks and dies constructed utilizing stereolithography and liquid molding compounds.

BACKGROUND OF THE INVENTION

Prototyping is typically used during product development to verify design concepts and to facilitate advance testing. A prototype must have structural characteristics sufficiently close to the desired product to permit a realistic prediction of actual product performance. Prototyping sheet metal formed parts can be expensive both in capital outlay and in development time. The manufacturing operations must first be defined for such parts and then the parts must be painstakingly produced by conventional cutting or forming processes, often requiring skilled labor, considerable time and expense.

Any number of sheet metal forming processes may be utilized to shape sheet metal blanks into desired parts.

These sheet metal forming processes include, but are not limited to, simple hydraulic press forming, stretch forming, deep drawing, and rubber pad forming operations (e.g., Guerin, Verson-Wheelon, Marform, Hydroform, and Hydrodynamic processes). The forming processes utilize formblocks or dies. Forces are exerted on the sheet metal blanks which are pressed against the formblocks whereby the sheet metal is forced to conform to the shape of the formblock.

Development of the formblocks or dies used in the forming process is costly both in terms of expense and time, especially when considering the number of design iterations and the relatively small prototype volumes. As such, increasing the efficiency of manufacturing prototypes or small batches of sheet metal parts is highly desirable.

It is well known that stereolithography may be utilized to create three-dimensional objects, such as prototype parts. Stereolithography conventionally calls for a laser beam to be directed by computer control into a bath of liquid photopolymer resin. The laser beam is traversed across the liquid resin to selectively cure the resin to form a three-dimensional object through the accumulation of incremental layers of cured resin. Thus, this technology melds computer modeling techniques with the actual creation of three-dimensional models.

A significant shortcoming of stereolithographically produced resin models, however, is that the resins employed have considerably less strength than the strength of materials designated for the final part (e.g., steel, aluminum or plastic). As such, parts produced using stereolithography have been limited to visualization models for verification of production intent, rather than for functional usage.

A technique used to strengthen stereolithograohically produce resin part is disclosed U.S. Pat. No. 5,616,293 to Ashtiani-Zarandi et al. The patent discloses a stereolithography build technique using internal interconnected support members.

Accordingly, there is a need in the art for a method to increase the efficiency to manufacture sheet metal parts, especially prototypes or small batches of parts.

SUMMARY OF THE INVENTION

In accordance with the present invention, there is provided a method of producing a sheet metal part utilizing stereolithography. A computer formblock model is first designed. Stereolithographic techniques are utilized to create a formblock using the computer formblock model. A part is formed from a sheet metal blank using the formblock, whereby force is applied to the sheet metal blank to bend it about the formblock.

It is contemplated that the stereolithographic process conventionally calls for a laser beam to be directed by computer control into a bath of liquid photopolymer resin. The laser beam is traversed across the liquid resin to selectively cure the resin to form a three-dimensional object through the accumulation of incremental layers of cured resin. Thus, the formblock is formed from a photopolymer resin.

The formblock may be created to be semi-hollow, having voids. The formblock may have an internal network of interconnected support members defining the shape of the formblock. The support members preferably having a hatch spacing of at least 0.004 inches. The formblock may be provided with an outer shell defining an outer surface of the formblock. Once the formblock is formed from the resin, the formblock may be placed in a centrifuge to drain away any uncured resin in liquid form.

Preferably, the outer shell of the formblock is filled with a liquid molding compound. The liquid molding compound is allowed to cure to structurally reinforce the formblock. The liquid molding compound may comprise a metal filled epoxy.

In the preferred embodiment of the method of the present invention, the sheet metal part is formed utilizing a rubber pad forming process. Of the various types of forming processes, it is contemplated that a Hydroform process is utilized.

In addition, the above-described method may be applied to construct a mold. Once the mold is constructed, the mold may be filled with a hardenable material to form a formblock which is utilized to form a part from a sheet metal blank using the formblock. The hardenable material may be a metal filled epoxy.

In addition, the present invention includes formblocks formed from the above-described methods and those sheet metal parts formed from formblocks formed from the above-described methods.

The present invention represents an advance in the art as it allows for increasing the efficiency of the manufacturing process of sheet metal parts, especially prototypes or small batches of parts. The method incorporates stereolithography technology to facilitate the rapid transition from design of a formblock on a computer aided drafting system to almost directly to a resin formblock model, thus bypassing traditional formblock construction methods.

Although it is contemplated that, upon curing, the resin formblock could be used to produce sheet metal parts, the present method provides for reinforcement of the formblock. The formblock may have an internal network of interconnected support members thereby leaving voids within the shape of the formblock. The formblock may then be filled with a liquid molding compound. The liquid molding compound may be many times stronger and more durable than a merely solid resin formblock. Advantageously, because the liquid molding compounds of the present invention tend to be significantly less expensive than photopolymer resins used in the stereolithographic process, this semi-hollow resin build approach is economically more desirable than creating solid resin formblocks.

In addition, the present inventive method provides for the stereolithographic construction of a mold to be used to form a formblock. This method is especially desirable in that the physical characteristics of the formblock are not limited by the stereolithographic process, i.e., comprising relatively low strength photopolymer resin.

Accordingly, based on the foregoing, the method of the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
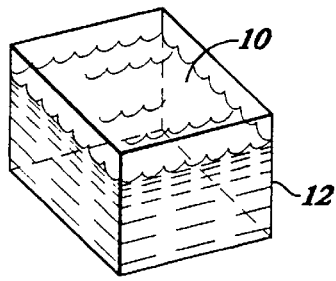
FIG. 1 is a symbolic depiction of a resin bath.
Figure 2:
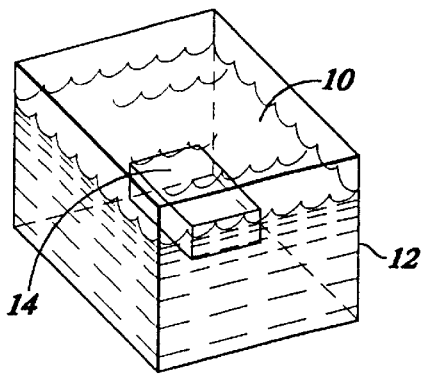
FIG. 2 is a symbolic depiction of a formblock in the resin bath after being formed using stereolithographic techniques.

Referring now to the drawings wherein the showings are for purposes of illustrating a preferred embodiment of the present invention only, and not for purposes of limiting the same, FIGS. 1–14 illustrate two sequences disclosing the methodology used to create the formblocks formed in accordance with the present invention. As will be described in more detail below, the method provides for utilizing stereolithography to construct formblocks to be used to produce sheet metal parts.

Referring now to FIGS. 1–6, in accordance with the present invention, there is provided a method of producing a sheet metal part utilizing stereolithography. There is first conducted the initial step of designing a computer formblock model. Next, stereolithographic techniques are applied to create a formblock using the computer formblock model. Finally, a sheet metal part is formed from a sheet metal blank using the formblock, whereby force is applied to the sheet metal blank to bend it about the formblock.

It is contemplated that the stereolithographic process conventionally calls for a laser beam to be directed by computer control into a bath of liquid photopolymer resin. FIG. 1 symbolically illustrates such a liquid photopolymer resin 10 in a container 12. A laser beam is traversed across the liquid resin to selectively cure the resin 10 to form a three-dimensional object through the accumulation of incremental layers of cured resin. Thus, the formblock 14 is formed from a photopolymer resin 10.

To test the described methods of the present invention, experiments were conducted. A SLA250 stereolithography machine manufactured by 3D Systems was utilized for the experiments. The resin used for the experiments was SL5170 photopolymer epoxy resin manufactured by Ciba Geigy (compressive strength of 11,700 psi and compressive modulus of 285,500 psi). In the first experiment, a rectangular formblock was constructed having dimensions of 0.5×0.27×1 cubic inches simulating the ASTM695 standard. The formblock was formed of solid resin using the ACES (Accurate Clear Epoxy Solid) build style. A rubber pad forming Hydropress and sheet metal blanks of 0.040 inch thick 7075-0 condition annealed aluminum were used for the experiment. During the experiment, in many cases, only 7 tons of force were needed to be applied to the sheet metal to form it over the resin formblocks and up to 350 tons of force was tested. During the experiment the resin formblock showed no signs of significant wear. In addition, 6061-0 condition aluminum sheet metal blanks were tested with similar results.

In another experiment, custom louvers were produced from aluminum sheet metal blanks. The louvers were approximately two (2) inches thick with a face area of 20.25 square inches. The louvers were formed by pressing aluminum blanks between two dies using 7 tons of force. A computer model of the louvers was designed using the Pro/Engineer CAD system. From this model, a two model die or formblock halves were constructed and inputted into the SLA250 stereolithography machine. Preparing the computer models took approximately one hour. Using the ACES build style, two resin formblock halves were formed overnight. The halves were cleaned of uncured resin and were finished for use. These operations took approximately one hour. It was estimated that using conventional machining processes to construct functionally similar formblocks, 96 labor hours would have been required (including 48 hours for N.C. programming, 32 hours for machining, and 16 hours for handiwork).

Figure 3:
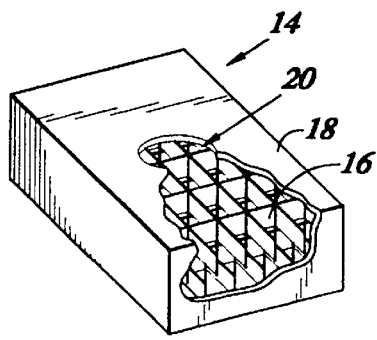
FIG. 3 is a symbolic depiction of the interior of the formblock.
Figure 4:
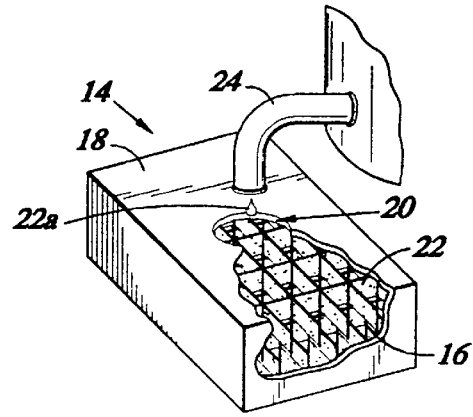
FIG. 4 is a symbolic depiction of the formblock being filled with a liquid molding compound.

In addition, referring now to FIG. 3, the constructed formblock 14 may be created to be semi-hollow, having voids. The formblock 14 may have an internal network of interconnected support members 16 defining the shape of the formblock 14. Thus, a cross-sectional view of such a formblock 14 would reveal a honeycomb-like interior. Preferably, the hatch spacing, i.e., the space between internal support members, is 0.004 inches. Such a hatch spacing facilitates ease of pouring the liquid molding compound 22. The formblock 14 may be provided with an outer shell 18 defining an outer surface of the formblock 14. Although not shown, it is contemplated that once the formblock 14 is formed from the resin, the formblock 14 may be placed in a centrifuge to drain away any uncured resin in liquid form. Preferably, the outer shell 18 of the formblock 14 is filled with a liquid molding compound 22, 22a, as depicted in FIG. 4. Show in FIG. 4 is a liquid molding compound 22, 22a in liquid form being poured into the interior of the formblock 14 from a liquid molding compound source 24. The outer shell 18 may be formed to have an opening 20 which facilitates the pouring of the liquid molding compound 22. Once poured, the liquid molding compound 22 is allowed to cure for structurally reinforcing the formblock 14. It is contemplated that the liquid molding compound 22 may be placed into the interior of the formblock 14 by any of those methods which are well known to one of ordinary skill in the art and may include pouring, spraying, blowing and injecting techniques. The liquid molding compound 22 may comprise a metal filled epoxy. The liquid molding compound 22 facilitates an overall increase of the compressive strength of the formblock 14.

In another experiment similar to the above described, louver experiment, resin formblock halves were constructed to be semi-hollow, rather than of solid resin. The formblock halves were constructed to have an internal network of interconnected support members defining the shape of the formblocks. A QuickCast build style which is a standard stereolithography technique defined by 3D Systems was used. These support members are similar to those shown in FIG. 3. The hatch spacing, i.e., the space between internal support members, was 0.004 inches. Typically, the standard hatch spacing currently used in the industry to form investment cast molds is approximately 0.002 inches. A hatch spacing of nearly double is preferably used in the present invention as the larger hatch spacing facilitates ease of pouring the liquid molding compound. After forming the formblocks using the stereolithography machine, the formblocks were placed in a centrifuge to extract any uncured liquid resin from the interior of the parts. The formblock halves were then allowed to postcure for several hours. This process was repeated to produce five sets of semi-hollow formblock halves for testing.

Five different liquid molding compounds with a range of relative compressive strengths were used to fill the five sets of semi-hollow formblocks. The liquid mold compounds used for testing were: Hapcast 3731, Hapcast 3736 and Hapcast 3732, manufactured by Hapco, Inc. (compressive strengths of 13,800 psi, 24,000 psi and 18,500 psi, respectively); Alumilite (compressive strength of 10,000 psi); and Sl5170 stereolithography resin was used for reference (compressive strength of 11,700 psi). Hapcure 7 was the curing compound used as a hardener which was mixed with the liquid molding compounds.

The finished formblocks were used to form sheet metal parts. It is contemplated that because the liquid molding compounds and the resin formblocks are both formed of epoxy materials, the materials bonded as a single unit. This is especially the case because the liquid molding compounds used in the experiments have a relatively low shrink rate of approximately 0.00075 per linear inch.

Figure 5:
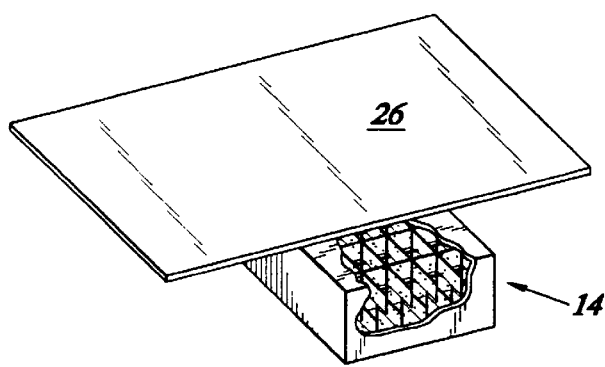
FIG. 5 is a symbolic depiction of the formblock with a sheet metal blank.
Figure 6:
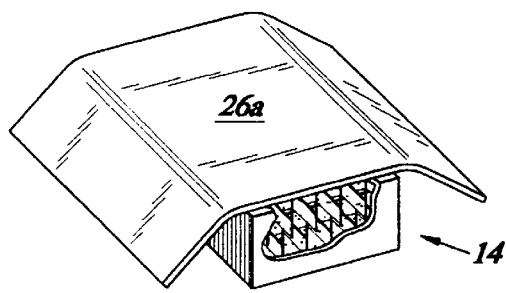
FIG. 6 is a symbolic depiction of a sheet metal part after being formed using formblock.

Referring now to FIG. 5, the formblock 14 may be used to preform work on a sheet metal blank 26. By applying force against the sheet metal blank 26 a finished sheet metal part 26a may be produced as shown in FIG. 6. It is understood the that the formblock 14, sheet metal blank 26, and sheet metal part 26a as depicted in FIGS. 1–6 are symbolic in nature and that in practice the shape and configuration of these members would take on forms wildly different than the simple shapes shown.

Figure 7:
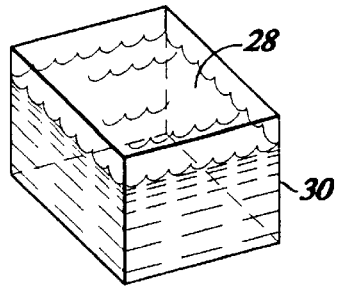
FIG. 7 is a symbolic depiction of a resin bath.
Figure 8:
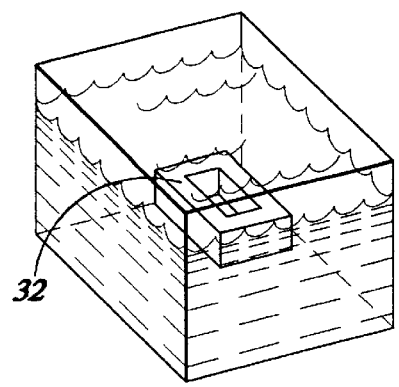
FIG. 8 is a symbolic depiction of a mold in the resin bath after being formed using stereolithographic techniques.

Referring now FIGS. 7–14, in another embodiment of the method of the present invention, a similar stereolithographic process may be applied to construct a mold 32. FIG. 7 shows a resin 28 contain within a container 30. Stereolithographic techniques are used to cure the resin 28 to form a mold 32 as depicted in FIG. 8.

Figure 9:
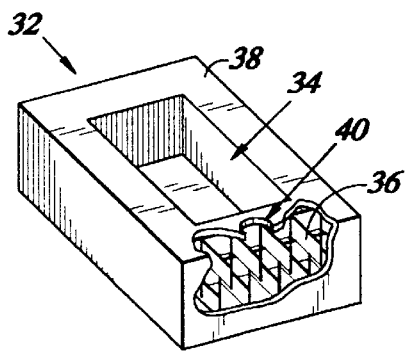
FIG. 9 is a symbolic depiction of the interior of the mold.
Figure 10:
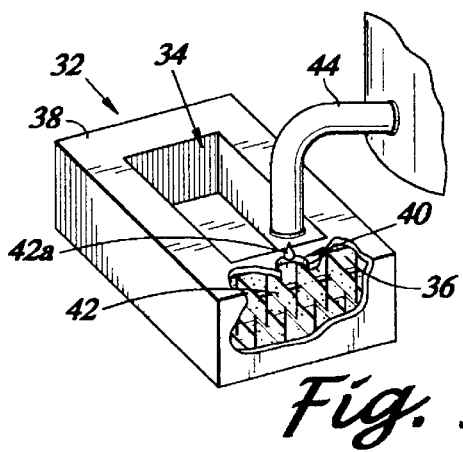
FIG. 10 is a symbolic depiction of the mold being filled with a liquid molding compound.

In addition, referring now to FIG. 9, the constructed mold 32 may be provided with a molding surface 34. The mold 32 may be created to be semi-hollow, having voids. The mold 32 may have an internal network of interconnected support members 36 defining the shape of the mold 32. Thus, a cross-sectional view of such a mold 32 would reveal a honeycomb-like interior. Preferably, the hatch spacing, i.e., the space between internal support members, is 0.004 inches. Such a hatch spacing facilitates ease of pouring the liquid molding compound 42. The mold 32 may be provided with an outer shell 38 defining an outer surface of the mold 32. Although not shown, it is contemplated that once the mold 32 is formed from the resin 28, the mold 32 may be placed in a centrifuge to drain away any uncured resin in liquid form. Preferably, the outer shell 38 of the mold 32 is filled with a liquid molding compound 42, 42a as depicted in FIG. 10. Show in FIG. 10 is a liquid molding compound 42, 42a in liquid form being poured into the interior of the mold 32 from a liquid molding compound source 44. The outer shell 38 may be formed to have an opening 40 which facilitates the pouring of the liquid molding compound 42. Once poured, the liquid molding compound 42 is allowed to cure for structurally reinforcing the mold 32. It is contemplated that the liquid molding compound 42 may be placed into the interior of the mold 32 by any of those methods which are well known to one of ordinary skill in the art and may include pouring, spraying, blowing and injecting techniques. The liquid molding compound 42 may comprise a metal filled epoxy. The liquid molding compound 42 facilitates an overall increase of the compressive strength of the mold 32.

Figure 11:
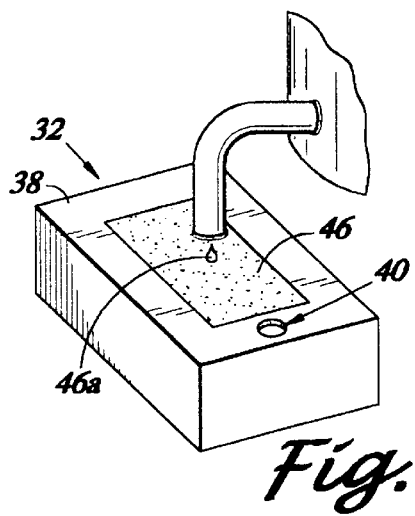
FIG. 11 is a symbolic depiction of the mold being filled with a hardenable material.
Figure 12:
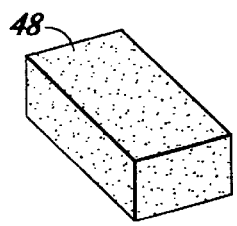
FIG. 12 is a symbolic depiction of a formblock formed form the hardenable material using the mold.
Figure 13:
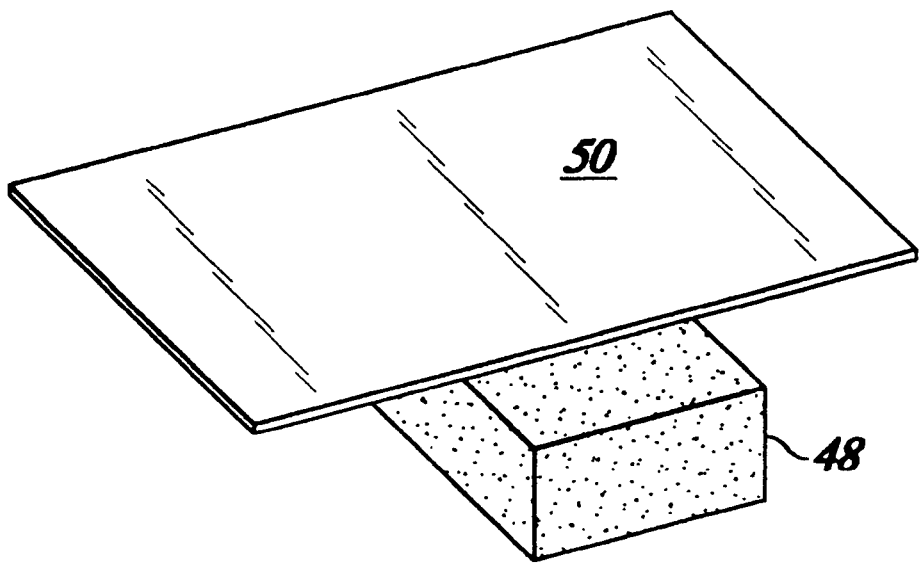
FIG. 13 is a symbolic depiction of the formblock with a sheet metal blank.
Figure 14:
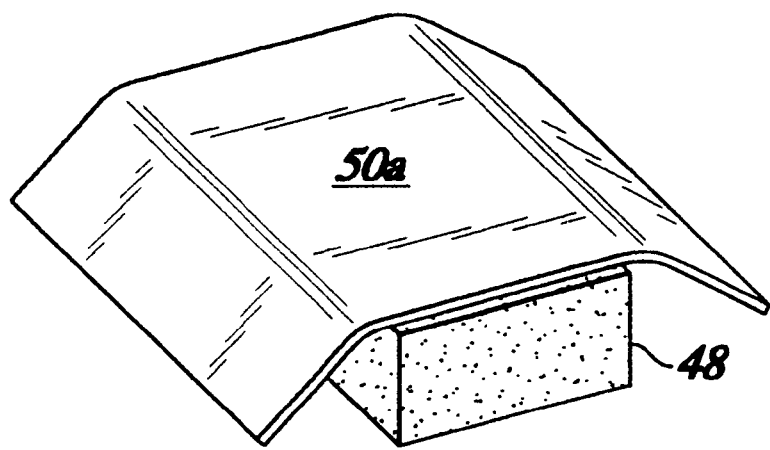
FIG. 14 is a symbolic depiction of a sheet metal part after being formed using formblock.

Once the mold 32 is constructed, the molding surface 34 of the mold 32 may be filled with a hardenable material 46, 46a to form a formblock 48 as shown in FIG. 11. Referring now to FIGS. 12 and 13, the formblock 48 is utilized to form a part 50a from a sheet metal blank 50 using the formblock 48, whereby force is applied to the sheet metal blank 50 to bend it about the formblock 48. The hardenable material 46 may be a metal filled epoxy. It is contemplated that a release agent would be used to coat the mold 32 prior to filling it. In experiments, it was found that tooling wax works particularly well in this application.

In the preferred embodiment of the method of the present invention, the sheet metal parts 26a and 50a are formed utilizing a rubber pad forming process. Any variety of sheet metal forming processes may be used which include, but are not limited to, simple hydraulic press forming, stretch forming, deep drawing, and rubber pad forming operations (e.g., Guerin, Verson-Wheelon, Marform, Hydroform, and Hydrodynamic processes).

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A method of producing a formblock for producing a sheet metal part whereby force is applied to a sheet metal blank to bend it about the formblock, the method utilizing stereolithography comprising the steps of:

(a) designing a computer formblock model; and (b) stereolithographically creating a formblock using the computer formblock model, the formblock being formed from a photopolymer resin having a compressive strength of at least 11.500 p.s.i. when formed into an rectangular block.

2. The method of claim 1 wherein the formblock is formed from a photopolymer resin.

3. The method of claim 1 wherein step (b) comprises creating the formblock to be semi-hollow.

4. The method of claim 1 wherein the formblock is created to have an internal network of interconnected support members defining the shape of the formblock.

5. The method of claim 4 wherein the internal network of interconnected support members having a hatch spacing of at least 0.004 inches.

6. The method of claim 4 wherein the formblock is further created to have an outer shell defining an outer surface of the formblock.

7. The method of claim 4 wherein step (b) comprises placing the formblock in a centrifuge to drain away uncured resin.

8. The method of claim 4 wherein step (b) further comprises filling the outer shell of the formblock with a liquid molding compound and curing the liquid molding compound to structurally reinforce the formblock.

9. The method of claim 8 wherein step (b) the liquid molding compound comprises a metal filled epoxy.

10. A formblock part made in accordance to the method of claim 1.

11. A formblock part made in accordance to the method of claim 4.

12. A method of producing a formblock for producing a sheet metal part whereby force is applied to a sheet metal blank to bend it about the formblock, the method utilizing stereolithography comprising the steps of:

(a) designing a computer mold model;

(b) stereolithographically creating a mold using the computer mold model; and (c) filling the mold with a hardenable material to form a formblock, the formblock being formed from a photopolymer resin having a compressive strength of at least 11,500 p.s.i. when formed into an rectangular block.

13. The method of claim 12 wherein step (b) the mold is formed from a photopolymer resin.

14. The method of claim 12 wherein step (b) comprises creating the mold to be semi-hollow.

15. The method of claim 14 wherein the mold is created to have an internal network of interconnected support members defining the shape of the mold.

16. The method of claim 15 wherein the internal network of interconnected support members having a hatch spacing of at least 0.004 inches.

17. The method of claim 15 wherein the mold is created to have an outer shell defining an outer surface of the mold.

18. The method of claim 17 wherein step (b) comprises placing the mold in a centrifuge to drain away uncured resin.

19. The method of claim 17 wherein step (b) further comprises filling the outer shell of the mold with a liquid molding compound and curing the liquid molding compound to structurally reinforce the mold.

20. The method of claim 19 wherein step (b) the liquid molding compound comprises a metal filled epoxy.

21. The method of claim 12 wherein step (c) the hardenable material comprises a metal filled epoxy.

22. A formblock made in accordance to the method of claim 12.

23. A formblock made in accordance to the method of claim 15.

* * * * *